July 13, 1926.
J. G. STIPP
STOCK CAR
Filed Jan. 7, 1926
1,592,787
2 Sheets-Sheet 1
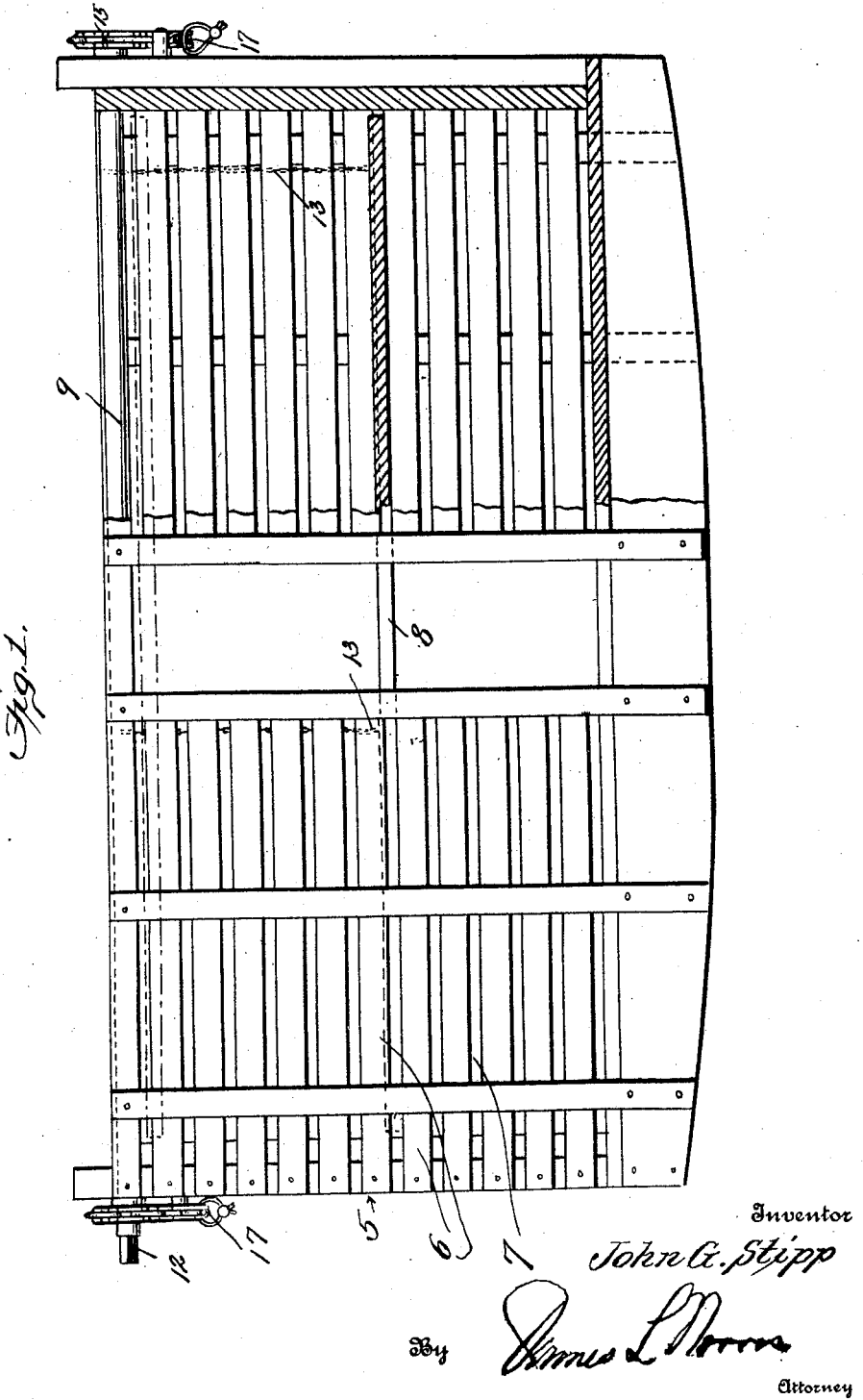

July 13, 1926.
J. G. STIPP
STOCK CAR
Filed Jan. 7, 1926
1,592,787
2 Sheets-Sheet 2
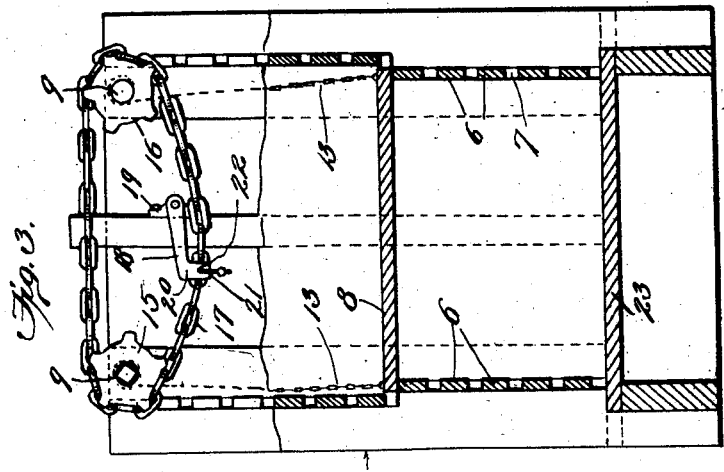
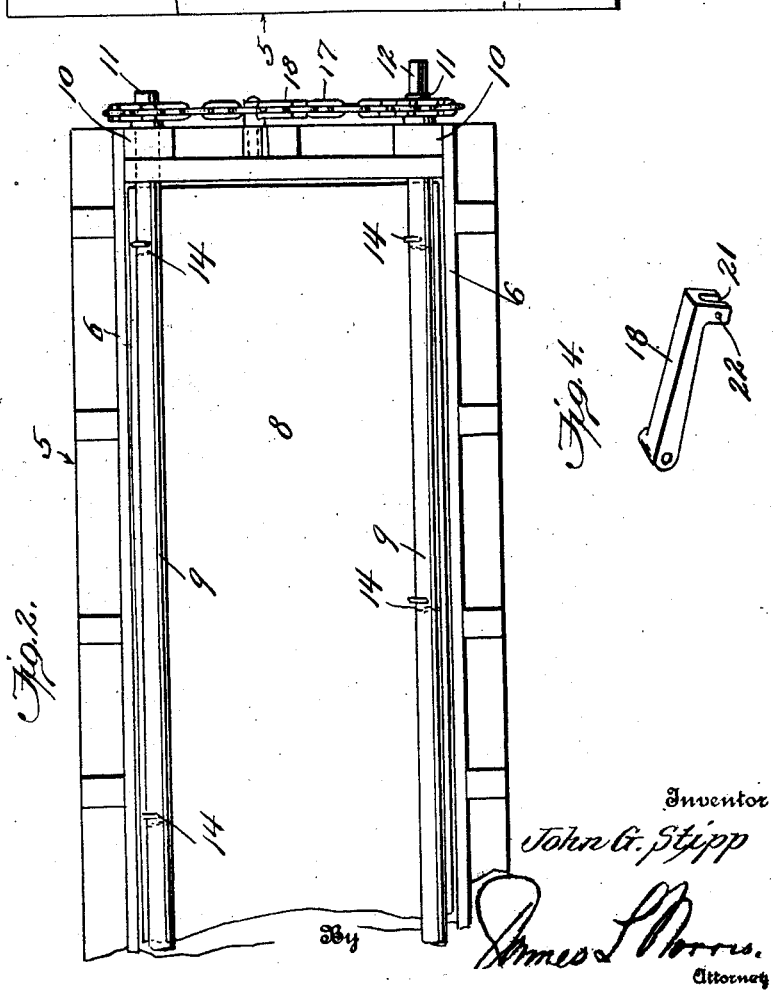
Inventor
John G. Stipp
By
Attorney Patented July 13, 1926.

1,592,787

UNITED STATES PATENT OFFICE.

JOHN G. STIPP, OF WINCHESTER, KENTUCKY.

STOCK CAR.

Application filed January 7, 1926. Serial No. 79,841.

This invention relates to stock cars, and the main object of the same is to provide an improved car of this type which can be converted from a single to a double deck car, and vice versa, for the purpose of modifying the interior of the car to accommodate transportation of animals of different sizes and wherein, also, the full capacity of the car may be utilized by the adjustment of a platform embodied as a part of the car organization and having operating means which may be easily actuated to raise and lower the platform and maintain the latter in positive locked position.

A further object of the invention is to provide a car of the class specified with means for dividing the interior thereof into compartments of various dimensions and associating with the said means operative mechanism which may be actuated from either end of the car to adjust the means to any elevation desired, and to embody as a part of the operating mechanism devices for locking a portion of said mechanism against actuation in such manner as to resist tampering with the locking means or release of the latter by unauthorized persons.

With these and other objects and advantages in view, the invention consists in the construction and arrangement of the several parts which will be more fully hereinafter described and claimed.

In the drawings:

Fig. 1 is a sectional side elevation of a car body of the side slatted type embodying the features of the invention, including a platform or horizontal partition which is shown in full and dotted lines, together with the mechanism for operating the same.

Fig. 2 is a top plan view of a portion of the car body, showing the roof removed and particularly illustrating the improved mechanism for operating the platform of the horizontal partition.

Fig. 3 is a sectional end elevation, respectively showing the platform or horizontal partition and a part of the means for operating the same and the exterior prime operating mechanism, including the locking means.

Fig. 4 is a detail perspective view of the locking means for the operating mechanism.

The numeral 5 designates a car body having side slats 6 with intervening spaces 7, to provide ventilation as in the ordinary construction of stock cars. The car body will of course be mounted on trucks and also in practice will have the usual roof or top covering disposed thereon and of any approved type. Within the interior of the body of the car and occupying almost completely the full dimensions thereof is a vertically movable platform or horizontal partition 8. At the top of the interior of the car are parallel shafts 9, which extend from end to end of the car and also through the ends, where suitable bearing means are provided as at 10. The ends of the shafts 9 are projected beyond the ends of the car as at 11 and the one projecting end of each shaft has an angular winding stub 12, these winding stubs being disposed in alternation with relation to the opposite ends of the car, or one being accessible at one end of the car and the other at the opposite end thereof. The platform or horizontal partition 8 has suspending chains or analogous devices 13 connected to the side portions thereof at intervals along the length of the said platform or partition, and these chains extend upwardly and have winding connections as at 40 with relation to the shafts 9. On the ends 11 of the shafts extending beyond or outwardly from the opposite car ends, sprocket wheels 15 and 16 are keyed and thereover are trained endless chain belts 17, this construction being duplicated at opposite ends of the car. The object of the sprocket wheels 15 and 16 and endless chain belts 17 is to uniformly rotate the shafts 9 in reverse directions for the purpose of adjusting or modifying the elevation of the platform or horizontal partition 8, the said platform or partition being elevated by turning each shaft 9 through the medium of the outer stub 12 thereof in one direction, and lowered by operating the stub of one shaft in the opposite direction. A suitable crank handle will be used in operating either shaft 9 from opposite ends of the car, and the motion imparted to the prime operating shaft will be regularly transmitted to the remaining shaft 9 through the endless chain belts 17.

After proper adjustment of the platform or horizontal partition 8 has been made, the chain belts will be locked against movement by drop dogs 18, pivoted to brackets 19 on portions of the car ends, as shown by Fig. 3, and having their free ends angularly depending as at 20 and formed with a slot or bifurcation 21 as shown in detail by Fig. 4, the angularly depending end 20 having a transverse opening 22 continuing through the bifurcated portion 21 to receive the wire of a seal, and whereby the dogs at the opposite ends of the car may be locked or securely fastened against disengagement to obstruct tampering with the operating mechanism by unauthorized persons for the purpose of modifying the elevation of the platform or horizontal partition 8 after the latter has been adjusted as desired. It is obvious that an authorized person may remove the seals from the dogs 18 when it is desired to unload the car, or to dispose the platform or horizontal partition 8 in unloading position above the bottom 23 of the car.

When the platform or horizontal partition 8 is adjusted to a point between the bottom and top of the car, cattle or stock of various sizes may be comfortably disposed within the interior of the car with material advantages in transportation in one car of small stock, for instance, in double the number that is capable of being transported in an ordinary car without the adjustable platform. The platform may be raised and lowered in loading and unloading as may be found desirable, as the operating mechanism is very powerful and will resist strain during such latter operations. The improved locking means in the form of the dogs cooperating with the endless chain belts 17 will insure positive retention of the platform or horizontal partition at the elevation desired, and another advantage of the improvement is that it may be readily applied to stock cars now in use without materially modifying the standard structure of the latter.

What is claimed as new is:

1. In a stock car of the class specified, the combination with a car body having a predetermined capacity, a horizontal platform elevatable and depressible within the body, side shafts extending along the upper portion of the body within the latter and projecting at their opposite ends beyond the ends of the car body, suspending means disposed interiorly of the body between the said shafts and horizontal platform and windable on and unwindable from the shafts, sprocket wheels on the projected ends of the shafts exteriorly of the said ends, there being a pair of these sprocket wheels at each end of the upper portion of the car body with an intervening space clear of operating means, an endless chain belt trained over each pair of sprocket wheels, and a locking device movably attached to each end of the car body and located between the upper and lower portions of each chain belt and having terminal means for engaging a link of the lower portion of the chain belt to prevent movement of the latter and of the shafts, suspending means and the horizontal platform.

2. In a stock car of the class specified, the combination with a body having a predetermined interior capacity, of a horizontal platform mounted within the body and free to move vertically, shafts extending the full length of the upper portion of the opposite sides of the body, flexible means within the body between the shafts and the platform and windable on and unwindable from the said shafts, the ends of the shafts being projected beyond the opposite ends of the body, a gear device on the projecting end of each shaft and located exterior of the adjacent end of the body, the opposite end pairs of the gear devices being in transverse alinement, an endless chain belt trained over each pair of gear devices, the one projected end of each shaft having a stub to receive means for actuating both shafts through the uniform gear connections and belts at opposite ends of the car body, the belts being disposed in substantially horizontal positions, and locking devices pivotally attached at one end to the exterior portions of the ends of the body and having free angular slotted ends to engage over and embrace links of the lower portions of the belts between the gear devices to temporarily lock the belts, gear devices, shafts, suspending means and platform against movement.

3. In a stock car of the class specified, the combination with a body having a predetermined interior capacity, of a horizontally disposed, vertically movable platform within the body to divide the interior of the said body into two parts, shafts along the sides of the upper portions of the body within the latter, the said shafts having ends projecting beyond and exteriorly of the ends of the body, gear devices on all of the projecting ends of the shafts, each pair of gear devices at each end of the body having a single operating endless belt trained thereover and extending transversely of the adjacent car end, and gravitating dogs pivotally connected to the exterior portions of the opposite ends of the body between the upper and lower portions of the chain belts and having free, angularly depending, slotted ends to engage links of the lower portions of the said belts to temporarily lock the operating mechanism and the platform against movement.

4. In a stock car of the class specified, the combination with a body having a predetermined interior capacity, of a horizontally disposed, vertically movable platform within the body to divide the interior thereof into two parts, shafts extending along the sides of the upper inner portions of the body and arranged close to said sides, said shafts having ends projecting beyond and exteriorly of the ends of the body, gear devices on all of the projecting ends of the shafts, each pair of gear devices exterior of each end of the car body having an endless belt trained thereover and extending transversely with relation to the car end, and gravitating dogs pivotally connected to the exterior portion of opposite ends of the body between the upper and lower portions of the endless belts and having free, angularly depending, slotted ends to engage the lower portions of the said belts to temporarily lock the operating mechanism against movement, the free slotted ends of the gravitating dogs also being provided with means to receive a device to secure the said ends of the dogs against disengagement by unauthorized persons and thereby also permanently lock the platform and the operating means therefor against movement for a predetermined period.

In testimony whereof I have hereunto set my hand.

JOHN G. STIPP.